US009441068B2

(12) United States Patent
Corinti et al.

(10) Patent No.: US 9,441,068 B2
(45) Date of Patent: Sep. 13, 2016

(54) VISCOELASTIC FOAM

(71) Applicant: DOW GLOBAL TECHNOLOGIES LLC, Midland, MI (US)

(72) Inventors: Elisa Corinti, Correggio (IT); Andrea Benvenuti, Reggio Emilia (IT); Alessio Sabadini, Reggio Emilia (IT); Jean-Paul Masy, Destelbergen (BE); Francois M. Casati, Pfaffikon (CH); Brian Dickie, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 199 days.

(21) Appl. No.: 14/344,343

(22) PCT Filed: Sep. 20, 2012

(86) PCT No.: PCT/EP2012/068508
§ 371 (c)(1),
(2) Date: Mar. 12, 2014

(87) PCT Pub. No.: WO2013/045336
PCT Pub. Date: Apr. 4, 2013

(65) Prior Publication Data
US 2015/0004389 A1    Jan. 1, 2015

(30) Foreign Application Priority Data
Sep. 29, 2011   (IT) ............................... MI2011A1750

(51) Int. Cl.
*C08G 18/76* (2006.01)
*C08G 18/48* (2006.01)
(Continued)

(52) U.S. Cl.
CPC ........... *C08G 18/7657* (2013.01); *C08G 18/14* (2013.01); *C08G 18/1833* (2013.01);
(Continued)

(58) Field of Classification Search
CPC .......... C08G 18/4812; C08G 18/4825; C08G 18/4833; C08G 18/4841
See application file for complete search history.

(56) References Cited

U.S. PATENT DOCUMENTS 7,022,746 B2    4/2006  Lockwood et al.
2003/0087979 A1*  5/2003  Bleys ................. C08G 18/4804
                                                521/155
(Continued)

FOREIGN PATENT DOCUMENTS

DE         4318120 A1    12/1994
EP         1404736 A1     4/2004
(Continued)

OTHER PUBLICATIONS

PCT/EP2012/068508, International Search Report dated Oct. 15, 2012.
PCT/EP2012/068508, International Preliminary Report on Patentability dated Apr. 1, 2014.
(Continued)

*Primary Examiner* — Melissa Rioja

(57) ABSTRACT

Embodiments of the invention provide for viscoelastic polyurethane foams. The foams are made from reaction system which includes (a) an isocyanate reactive component, (b) a isocyanate component, (c) one or more blowing agents, (d) a catalyst component, and (e) a silicone based surfactant. The isocyanate reactive component includes at least (i) from 25 to 80% by weight of at least one polyoxyethylene capped polyoxypropylene/polyoxyethylene polyol having a combined number average equivalent weight from 1300 to 1700, a polyoxyethylene percentage of between 75% and 95% by weight of the combined amounts of polyoxypropylene and polyoxyethylene, and a primary OH percentage of between 80 and 95% of the total number of OH groups of the polyoxyethylene capped polyoxypropylene/polyoxyethylene polyol, and (ii) from 5 to 30% by weight of the isocyanate reactive component of at least one low functionality polyol having a functionality of between 1.5 and 2.5, a combined number average equivalent weight from 500 to 1500 and an OH number of 40 to 70.

9 Claims, 3 Drawing Sheets

Figure 1:
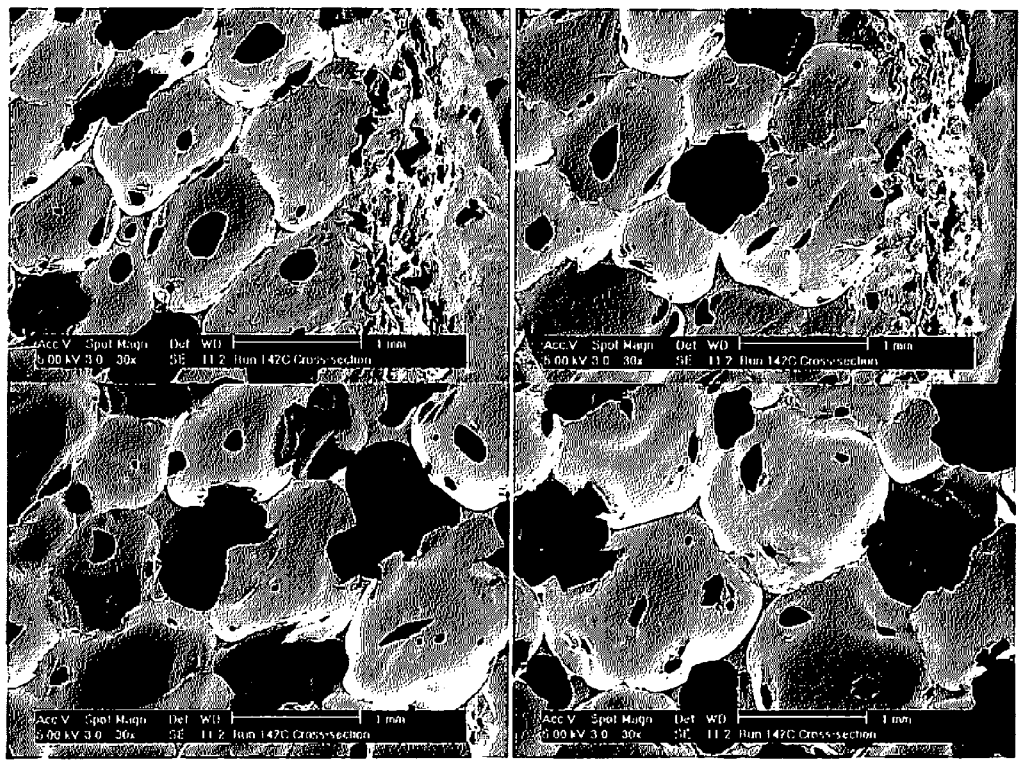

(51) Int. Cl.
    *C08G 18/63*     (2006.01)
    *C08G 18/40*     (2006.01)
    *C08G 18/08*     (2006.01)
    *C08G 18/18*     (2006.01)
    *C08G 18/32*     (2006.01)
    *C08J 9/00*     (2006.01)
    *C08G 101/00*     (2006.01)

(52) U.S. Cl.
    CPC ....... *C08G18/3206* (2013.01); *C08G 18/4072* (2013.01); *C08G 18/4812* (2013.01); *C08G 18/4829* (2013.01); *C08G 18/4841* (2013.01); *C08G 18/4845* (2013.01); *C08G 18/632* (2013.01); *C08G 18/7671* (2013.01); *C08J 9/0042* (2013.01); *C08G 18/4825* (2013.01); *C08G 18/4833* (2013.01); *C08G 2101/0008* (2013.01); *C08G 2101/0033* (2013.01); *C08G 2101/0083* (2013.01); *C08J 2375/08* (2013.01)

(56) References Cited

U.S. PATENT DOCUMENTS

| | | |
|---|---|---|
| 2005/0131095 A1 | 6/2005 | Yu et al. |
| 2011/0034575 A1 | 2/2011 | Triouleyre et al. |
| 2015/0065611 A1* | 3/2015 | Esbelin ................ C08G 59/066 523/455 |

FOREIGN PATENT DOCUMENTS

| | | |
|---|---|---|
| EP | 2041199 A1 | 4/2009 |
| WO | 01/32736 A1 | 5/2001 |
| WO | 01/60884 A1 | 8/2001 |
| WO | 2008/021034 A2 | 2/2008 |
| WO | 2012/033674 A1 | 3/2012 |
| WO | 2012/050671 A1 | 4/2012 |

OTHER PUBLICATIONS

PCT/EP2012/068508, Written Opinion of the International Searching Authority dated Oct. 15, 2012.

* cited by examiner

VISCOELASTIC FOAM

FIELD OF THE INVENTION

Embodiments of the present invention relate to polyurethane foams. More particularly, embodiments of the present invention relate to polyurethane foams having viscoelastic properties.

BACKGROUND OF THE INVENTION

Polyurethane foams are used in a wide variety of applications, ranging from cushioning (such as mattresses, pillows and seat cushions) to packaging, shoe soling, to thermal insulation and for medical and automotive applications. One class of polyurethane foam is known as viscoelastic (VE) or "memory" foam. Viscoelastic foams exhibit a time-delayed and rate-dependent response to an applied stress. They have low resiliency, open cells and recover slowly when compressed. These properties are often associated with the glass transition temperature (Tg) of the polyurethane. Viscoelasticity is often manifested when the polymer has a Tg at or near the use temperature, which is room temperature for many applications, such as acoustic in automotive application or comfort in furniture application.

Viscoelastic foam can be produced in slabstock or in molding, either as a pad or as part of a composite, for instance with a heavy layer. One type of viscoelastic foams include viscoelastic molded foams with foamed interiors and more compact outer skin layers used directly with a thin fabric cover in furniture applications, such as mattresses, pillows, and medical devices.

Molded viscoelastic polyurethane foams can be formed in an open mold process or a closed mold process. In the open mold process two reactive components are mixed and poured into an open mold and well dispersed onto the mold surface. The mold is then closed and the mixture is allowed to expand and cure. With the closed mold process, the mixed components are injected into a closed mold through an injection point, hence foaming mass has to flow well within the mold. In both cases a release agent may be to be applied by spraying or brushing onto the mold surface including the lid before foam injection (between 10 seconds and 1 minute depending on the process conditions) to prevent the foam to stick to the mold and in order to get a foam skin without surface and/or sub-surface defects, such as pin holes, voids, local collapses, bubbles, blisters, and skin peeling, which may be detrimental for the application, both for aesthetic and for comfort reasons.

Two types of release agents may be used: a solvent based system whereby a solvent is evaporated when in contact with the heat of the mold, hence releasing a waxy layer onto the foam surface, or a water based release agent, where most of water has no time for evaporation before foam injection, hence the release agent has to be formulated properly to avoid this residual water to react with the isocyanate, hence to create local, undesirable gas formation. For environmental reasons, water based release agents are nowadays preferred to reduce volatile organic compounds. In addition to the effect of release agents, the skin formation and quality of viscoelastic foams is governed by foam formulation, controlling nucleation, cell formation, cell stabilization, and gelation. Preferably the skin is smooth and flexible, while at the same time is strong to avoid tearing at demold and during handling and storing.

Like most polyurethane foams, in VE polyurethane foams the two reactive components are a polyol component and a polyisocyanate component. The two components may be reacted in the presence of a blowing agent. The blowing agent is usually water or, less preferably, a mixture of water and another material. The predominant polyol used in these formulations has a functionality of about 3 hydroxyl groups/molecule and a molecular weight in the range of 400-1500. This polyol composition is primarily the principal determinant of the Tg (Glass Transition Temperature) of the polyurethane foam, although other factors such as water levels and isocyanate type and index also play significant roles. However, as mentioned above, the skin of molded viscoelastic pads may have surface defects and/or sticky surfaces upon being demolded, with both solvent and water based release agents, resulting in a high scrap rate.

Therefore, there is a need for slab stock foam without internal collapses, to maximize production yield.

SUMMARY OF THE INVENTION

Embodiments of the invention provide for viscoelastic polyurethane foams. The foams are made from reaction system which includes (a) an isocyanate reactive component, (b) a isocyanate component, (c) one or more blowing agents, (d) a catalyst component, and (e) a silicone based surfactant. The isocyanate reactive component includes at least (i) from 25 to 80% by weight of at least one polyoxyethylene capped polyoxypropylene/polyoxyethylene polyol having a combined number average equivalent weight from 1300 to 1700, a polyoxyethylene percentage of between 75% and 95% by weight of the combined amounts of polyoxypropylene and polyoxyethylene, and a primary OH percentage of between 80 and 95% of the total number of OH groups of the polyoxyethylene capped polyoxypropylene/polyoxyethylene polyol, and (ii) from 5 to 30% by weight of the isocyanate reactive component of at least one low functionality polyol having a functionality of between 1.5 and 2.5, a combined number average equivalent weight from 500 to 1500 and an OH number of 40 to 70.

DESCRIPTION OF EMBODIMENTS OF THE INVENTION

Embodiments of the present invention provide for viscoelastic foams having improved skin formation. These foams do not collapse, skin peel, nor form voids upon demolding, and yet maintain excellent physical properties such as uniform cell sizes, viscoelestisity, and high quality surface appearance.

Embodiments encompass polyurethane foams which include the reaction products of a reaction system which includes at least: (a) an isocyanate reactive component, (b) a polyisocyanate component, (c) water, and (d) a catalyst components, (e) a surfactant component.

The isocyanate reactive components (a) used in polyurethane production are generally those compounds having at least two hydroxyl groups. Those compounds are referred to herein as polyols. The polyols include those obtained by the alkoxylation of suitable starting molecules (initiators) with an alkylene oxide such as ethylene oxide, propylene oxide, or butylene oxide. Examples of initiator molecules having 2 to 4 reactive sites include water, ammonia, or polyhydric alcohols such as dihydric alcohols having a molecular weight from 62 to 399, especially the alkane polyols such as ethylene glycol, propylene glycol, hexamethylene diol, glycerol, trimethylol propane or trimethylol ethane, or low molecular weight alcohols containing ether groups such as diethylene glycol, triethylene glycol, dipropylene glycol, tripropylene glycol or butylene glycols. These polyols are conventional materials prepared by conventional methods. For polyols, when the term "triol" or "monol" is used, the functionality of the starting initiator (such as glycerin for triols and n-butanol for monols) is intended. Catalysis for this polymerization can be either anionic or cationic, with catalysts such as potassium hydroxide (KOH), cesium hydroxide (CsOH), boron trifluoride, or a double metal cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

Component (a) may be an isocyanate reactive component comprising (i) from 25 to 80% by weight of the isocyanate reactive component of one or more polyoxyethylene rich polyols.

In certain embodiments, the one or more polyoxyethylene-rich polyols ((a)(i)) may comprise at least 25 wt. %, 30 wt. %, 35 wt. %, 40 wt. %, 45 wt. %, 50 wt. %, 55 wt. %, 60 wt. %, 65 wt. %, 70 wt. %, or 75 wt. % of the total isocyanate reactive component (a). In certain embodiments, the one or more polyoxyethylene-rich polyols ((a)(i)) may comprise up to 50 wt. %, 55 wt. %, 60 wt. %, 65 wt. %, 70 wt. %, 75 wt. %, or 80 wt. %. The one or more polyoxyethylene-rich polyols ((a)(i)) may comprise from 50 wt. % to 80 wt. % by weight or from 55 wt. % to 75 wt. % of the total isocyanate reactive component (a).

In certain embodiments, the one or more polyoxyethylene-rich polyols ((a)(i)) have a combined number average equivalent weight from 1300 to 1700. In certain embodiments, the one or more polyoxyethylene-rich polyols ((a)(i)) have a combined number average equivalent weight of at least 1300, 1350, 1400, 1450, 1500, 1550, or 1600. In certain embodiments, the one or more polyoxyethylene-rich polyols ((a)(i)) have a combined number average equivalent weight of up to 1350, 1400, 1450, 1500, 1550, 1600, 1650 or 1700.

In certain embodiments, the one or more polyoxyethylene-rich polyols ((a)(i)) have a functionality between 2 and 6. In certain embodiments, the one or more polyoxyethylene-rich polyols ((a)(i)) have a functionality between 2.5 and 4.

In certain embodiments, the one or more polyoxyethylene-rich polyols ((a)(i)) have an polyoxyethylene content of at least 75 wt. %, 80 wt. %, 82 wt. %, 85 wt. %, 87 wt. %, 90 wt. %, or 92 wt. % of the total mass of the one or more polyoxyethylene-rich polyols. In certain embodiments, the one or more polyoxyethylene-rich polyols ((a)(i)) have an polyoxyethylene content of up to 80 wt. %, 82 wt. %, 85 wt. %, 87 wt. %, 90 wt. %, 92 wt. %, or 95 wt. % of the total mass of the one or more polyoxyethylene-rich polyols. The one or more polyoxyethylene-rich polyols ((a)(i)) may have an polyoxyethylene content greater than 80% but less than 95% of the total mass of the one or more polyoxyethylene-rich polyols or from 85 wt. % to 95 wt. % of the total mass of the one or more polyoxyethylene-rich polyols.

In certain embodiments, the one or more polyoxyethylene-rich polyols ((a)(i) have a primary OH content of at least 80%, 82%, 85%, 87%, 90%, or 92% of the total number of OH groups of the polyoxyethylene-rich polyols ((a)(i)). In certain embodiments, the one or more polyoxyethylene-rich polyols ((a)(i) have a primary OH content of up to 85%, 87%, 90%, 92%, or 95% of the total number of OH groups of the polyoxyethylene-rich polyols ((a)(i)).

In certain embodiments, the polyoxyethylene-rich polyols may comprise at least one polyoxyethylene capped polyoxypropylene/polyoxyethylene polyol having a combined number average equivalent weight from 1300 to 1700, a polyoxyethylene percentage of between 75% and 95% by weight of the combined amounts of polyoxypropylene and polyoxyethylene, and a primary OH percentage of between 80 and 95% of the total number of OH groups of the polyoxyethylene capped polyoxypropylene/polyoxyethylene polyol, and, in certain embodiments, may be a triol. An example of such a polyol is VORANOL 1447, available from the Dow Chemical Company.

Component (a) may further include an isocyanate reactive component comprising (ii) from 5 to 30% by weight of the isocyanate reactive component of one or more low functionality polyols. In certain embodiments, the one or more low functionality polyols ((a)(ii)) have a functionality between 1.5 and 2.5. In certain embodiments, the one or more low functionality polyols ((a)(ii)) have a functionality between 1.7 and 2.3. In certain embodiments, the one or more low functionality polyols ((a)(ii)) may be diols.

In certain embodiments, the one or more low functionality polyols ((a)(ii)) may comprise at least 5 wt. %, 10 wt. %, 15 wt. %, 20 wt. %, or 25 wt. % of the total isocyanate reactive component (a). In certain embodiments, the one or more low functionality polyols ((a)(ii)) may comprise up to 10 wt. %, 15 wt. %, 20 wt. %, 25 wt. %, or 30 wt. %. The one or more low functionality polyols ((a)(ii)) may comprise from 5 wt. % to 30 wt. % by weight or from 10 wt. % to 20 wt. % of the total isocyanate reactive component (a).

In certain embodiments, the one or more low functionality polyols ((a)(ii)) have a combined number average equivalent weight from 500 to 1500. In certain embodiments, the one or more low functionality polyols ((a)(ii)) have a combined number average equivalent weight of at least 500, 600, 700, 800, 900, 1000, 1100, 1200, 1300, 1350, or 1400. In certain embodiments, the one or more low functionality polyols ((a)(ii)) have a combined number average equivalent weight of up to 700, 800, 900, 950, 1000, 1050, 1100, 1200, 1300, 1350, 1400, 1450, or 1500.

In certain embodiments, the one or more low functionality polyols ((a)(ii)) have a OH number of at least 40 45, 50, 60, or 65. In certain embodiments, the one or more low functionality polyols ((a)(ii)) have a OH number of up to 45, 50, 60, 65, or 70.

Examples of suitable diols may include VORANOL P 2000, available from The Dow Chemical Company.

Component (a) may further include an isocyanate reactive component comprising (iii) from 5 to 30% by weight of the isocyanate reactive component of one or more high functionality polyols. In certain embodiments, the one or more high functionality polyols ((a)(iii)) have a functionality between 4 and 6. In certain embodiments, the one or more high functionality polyols ((a)(iii)) have a functionality between 4.5 and 5. In certain embodiments, the one or more high functionality polyols ((a)(iii)) may have a functionality of 4.7.

In certain embodiments, the one or more high functionality polyols ((a)(iii)) may comprise at least 5 wt. %, 10 wt. %, 15 wt. %, 20 wt. %, or 25 wt. % of the total isocyanate reactive component (a). In certain embodiments, the one or more high functionality polyols ((a)(iii)) may comprise up to 10 wt. %, 15 wt. %, 20 wt. %, 25 wt. %, or 30 wt. %. The one or more high functionality polyols ((a)(iii)) may comprise from 5 wt. % to 30 wt. % by weight or from 10 wt. % to 20 wt. % of the total isocyanate reactive component (a).

In certain embodiments, the one or more high functionality polyols ((a)(iii)) have a combined number average molecular weight from 4000 to 5500. In certain embodiments, the one or more high functionality polyols ((a)(iii)) have a combined number average molecular weight of at least 4000, 4500, 5000, or 5500. In certain embodiments, the one or more high functionality polyols ((a)(iii)) have a combined number average molecular weight of up to 4500, 5000, or 5500, or 5000.

In certain embodiments, the one or more high functionality polyols ((a)(iii)) have a OH number of at least 25, 30, 35, or 40. In certain embodiments, the one or more high functionality polyols ((a)(iii)) have a OH number of up to 30, 35, or 40, or 45.

In certain embodiments the one or more high functionality polyols ((a)(iii)) may be a polyoxyethylene capped polyoxypropylene polyol having a average functionality between 4 and 6, a combined number average molecular weight from 4000 to 6000, and an OH number of 25 to 45. Suitable Examples are for example SPECFLEX NC 632, available from The Dow Chemical Company.

Component (a) may further include an isocyanate reactive component comprising (iv) from 5 to 30% by weight of the isocyanate reactive component of one or more triols.

In certain embodiments, the one or more triols ((a)(iv)) may comprise at least 5 wt. %, 10 wt. %, 15 wt. %, 20 wt. %, or 25 wt. % of the total isocyanate reactive component (a). In certain embodiments, the one or more triols ((a)(iv)) may comprise up to 10 wt. %, 15 wt. %, 20 wt. %, 25 wt. %, or 30 wt. %. The one or more triols ((a)(iv)) may comprise from 5 wt. % to 30 wt. % by weight or from 10 wt. % to 20 wt. % of the total isocyanate reactive component (a).

In certain embodiments, the one or more triols ((a)(iv)) have a combined number average equivalent weight from 200 to 400. In certain embodiments, the one or more triols ((a)(iv)) have a combined number average equivalent weight of at least 200, 250, 300, or 350. In certain embodiments, the one or more triols ((a)(iv)) have a equivalent number average equivalent weight of up to 250, 300, 350 or 400.

In certain embodiments, the one or more triols ((a)(iv)) have a OH number of at least 175, 200, 225, or 250. In certain embodiments, the one or more triols ((a)(iv)) have a OH number of up to 200, 225, 250, or 275.

In certain embodiments the one or more triols ((a)(iv)) may glycerine initiated polyoxypropylene having a combined number average equivalent weight from 200 to 400 and an OH number of 175 to 275. Suitable examples are for example VORANOL CP 755, available from The Dow Chemical Company.

One or more of components ((a)(i))-((a)(iv)) may be a polymer polyol which also contains a disperse polymer phase. The disperse polymer phase may be particles of an ethylenically unsaturated monomer (of which styrene, acrylonitrile and styrene-acrylonitrile copolymers are of particular interest), polyurea particles, or polyurethane particles. The disperse phase may constitute from 5 to 60% by weight of the polymer polyol. Embodiments encompass grafted polyether polyols containing from 30 to 50% copolymerized styrene and acrylonitrile (SAN).

Alternatively the polymer polyol may be a separate copolymer polyol ((a)(v). Suitable commercially available products of that type include SPECFLEX NC 700, available from The Dow Chemical Company.

One or more component (a) may be polyols based on renewable resources, such as epoxidized or hydroformylated seed oil, such as soybean oil, or straight castor oil.

Component (b) may comprise one or more organic polyisocyanate components having an average of 1.8 or more isocyanate groups per molecule. The isocyanate functionality is preferably from about 1.9 to 4, and more preferably from 1.9 to 3.5 and especially from 2.0 to 3.3.

The one or more organic polyisocyanate components may be a polymeric polyisocyanate, aromatic isocyanate, cycloaliphatic isocyanate, or aliphatic isocyanate. Exemplary polyisocyanates include m-phenylene diisocyanate, tolulene-2,4-diisocyanate, tolulene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate.

Preferred polyisocyanates include MDI and derivatives of MDI such as biuret modified "liquid" MDI products and polymeric MDI. Preferred polyisocyanates are the so-called polymeric MDI products, which are a mixture of polymethylene polyphenylene polyisocyanates in monomeric MDI. In one embodiment, the polymeric MDI comprises 70 wt. % or more of the total isocyanate. Especially suitable polymeric MDI products have a free MDI content of from 5 to 50% by weight, more preferably 10 to 40% by weight. Such polymeric MDI products are available from The Dow Chemical Company under the trade names PAPI and VORANATE.

An especially preferred polyisocyanate is a polymeric MDI product having an average isocyanate functionality of from 2.3 to 3.3 isocyanate groups/molecule and an isocyanate equivalent weight from 120 to 170, preferably from 125 to 135. Suitable commercially available products of that type include PAPI PB-219, PAPI 27, VORANATE M229, VORANATE 220, VORANATE 290, VORANATE M595 and VORANATE M600, all of which are available from The Dow Chemical Company.

Component (b) may alternatively or additionally comprise one or more isocyanate terminated prepolymers, in which a stoichiometric excess of any of the above isocyanates or mixture of isocyanates is first reacted with any of the above mentioned or other polyol(s) to form a prepolymer. In certain embodiments, the prepolymer may made using a mixture of ,4'-methylene diphenyl isocyanate, 4,4'-methylene diphenyl diisocyanate, and polymeric methylene diphenyl diisocyanate. In certain embodiments, the prepolymer may made using a polyoxyethylene/polyoxypropylene capped polyoxypropylene polyol having a functionality between 2 and 4, a polyoxyethylene percentage between 60 and 90, and an OH number between 25 and 40 mg KOH/g.

In certain embodiments, the reaction system further comprises (c) a blowing agent. In certain embodiments, the blowing agent content is from 1% to 5% by weight of the total weight of the reaction system. In certain embodiments, the blowing agent content is from 3% to 4% by weight of the total weight of the reaction system. In certain embodiments, the blowing agent is water.

In certain embodiments, the reaction system further comprises (d) one or more catalysts. Catalysts are typically used in small amounts, for example, each catalyst being employed from 0.0015 to 5% by weight of the total reaction system. The amount depends on the catalyst or mixture of catalysts, the desired balance of the gelling and blowing reactions for specific equipment, the reactivity of the polyols and isocyanate as well as other factors familiar to those skilled in the art.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)_4$, $Sn(OR)_4$ and $Al(OR)_3$, wherein R is alkyl or aryl, and the reaction products of the alcoholates with carboxylic acids, beta-diketones and 2-(N, N-dialkylamino)alcohols; alkaline earth metal, Bi, Pb, Sn or Al carboxylate salts; and tetravalent tin compounds, and tri- or pentavalent bismuth, antimony or arsenic compounds. Examples of commercially available tertiary amine catalysts include: trimethylamine, triethylamine, N-methylmorpholine, N-ethylmorpholine, N,N-dimethylbenzylamine, N,N-dimethylethanolamine, N,N-dimethylaminoethyl, N,N,N',N''-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of commercially available amine catalysts include NIAX A1 and NIAXA99 (bis(dimethylaminoethyl) ether in propylene glycol available from Momentive Performance Materials), NIAXB9 (N,N-dimethylpiperazine and N-N-dimethylhexadecylamine in a polyalkylene oxide polyol, available from Momentive Performance Materials), DABCO 8264 (a mixture of bis(dimethylaminoethyl)ether, triethylenediamine and dimethylhydroxyethyl amine in dipropylene glycol, available from Air Products and Chemicals), DABCO 33LV (triethylene diamine in dipropylene glycol, available from Air Products and Chemicals), DABCO BL-11 (a 70% bis-dimethylaminoethyl ether solution in dipropylene glycol, available from Air Products and Chemicals, Inc), NIAXA-400 (a proprietary tertiary amine/carboxylic salt and bis(2-dimethylaminoethy)ether in water and a proprietary hydroxyl compound, available from Momentive Performance Materials); NIAXA-300 (a proprietary tertiary amine/carboxylic salt and triethylenediamine in water, available from Momentive Performance Materials); POLYCAT 58 (a proprietary amine catalyst available from Air Products and Chemicals), POLYCAT 5 (pentamethyl diethylene triamine, available from Air Products and Chemicals) and POLYCAT 8 (N,N-dimethyl cyclohexylamine, available from Air Products and Chemicals). Autocatalytic polyols can also be used to reduce VOC's.

In another embodiment, the reaction system further comprises (e) one or more surfactants to help stabilize the foam as it expands and cures. Surfactants are typically used in small amounts, for example, each catalyst being employed from about 0.0015 to about 5% by weight of the total reaction system. The amount depends on the surfactants or mixture of surfactants, as well as other factors familiar to those skilled in the art.

Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB B-8462, B-8404, B-8715 LF2, and B-8871 (available from Evonik AG); DC-198 and DC-5043 surfactants, available from Dow Corning; and NIAX L-627, L-620, L-618, L-6633, and L-6900 available from Momentive Performance Materials.

In a further embodiment, to improve processing and to permit the use of higher isocyanate indices, additional additives such as those described in publication WO 20008/021034, the disclosure of which is incorporated herein by reference, may be added to the reaction mixture. Such additives include 1) alkali metal or transition metal salts of carboxylic acids; 2) 1,3,5-tris alkyl- or 1,3,5-tris(N,N-dialkyl amino alkyl)-hexahydro-s-triazine compounds; and 3) carboxylate salts of quaternary ammonium compounds. When used, such additives are generally used in an amount from about 0.01 to 1 part per 100 total polyol. The additional additive is generally dissolved in at least one other component of the reaction mixture. It is generally not preferred to dissolve it in the polyisocyanate.

Various additional components may be included in the viscoelastic foam formulation. These include, for example, crosslinkers, plasticizers, fillers, smoke suppressants, fragrances, reinforcements, dyes, colorants, pigments, preservatives, odor masks, physical blowing agents, chemical blowing agents, flame retardants, internal mold release agents, biocides, antioxidants, UV stabilizers, antistatic agents, thixotropic agents, adhesion promoters, cell openers, and combination of these.

The foamable composition may contain a cell opener or crosslinker. When these materials used, they are typically used in small quantities such as up to 10 parts, especially up to 2 parts, by weight per 100 parts by weight of the total reactive system. A cross-linker is a material having, on average, greater than two isocyanate-reactive groups per molecule. In either case, the equivalent weight per isocyanate-reactive group can range from about 30 to less than 100, and is generally from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol.

One or more fillers may also be present in the viscoelastic foam formulation. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include recycled foam, kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler.

Reactive particles may also be included in the reaction system to modify the properties of the viscoelastic foam. Such reactive systems include copolymer polyols such as those containing styrene/acrylonitrile (SAN), polyharnstoff dispersion (PHD) polyols and polyisocyanate polyaddition products (PIPA), for instance as taught in Chemistry and Technology of Polyols for Polyurethanes, Rapra Technology Limited (2005) pp 185-227.

When used, fillers advantageously constitute from about 0.5 to about 30%, especially about 0.5 to about 10%, by weight of the reaction system.

Although no additional blowing agent (other than the water) in the foamable polyurethane composition is generally used, it is within the scope of the embodiments described herein to include an additional physical or chemical blowing agent. The physical blowing agents can be, but are not limited to, liquid carbon dioxide ($CO_2$), supercritical $CO_2$ and various hydrocarbons, fluorocarbons, hydrofluorocarbons, chlorocarbons, chlorofluorocarbons, hydrochlorofluorocarbons, and acetone. Chemical blowing agents are materials that decompose or react (other than with isocyanate groups) at elevated temperatures to produce carbon dioxide and/or nitrogen Polyurethane viscoelastic foams may be produced by combining isocyanate component and the at least polyol components, along with any optional additives. The isocyanate polyol components may be reacted at isocyanate indexes from 60 to 110. All individual values and subranges from 60 to 110 are included herein and disclosed herein; for example, the index can be from a lower limit of 60, 65, 70, 75, 80, 85, 90, or 95 to an upper limit of about 75, 80, 85, 90, 95, 99, 100, 105, or 110.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams have densities below 100 $kg/m^3$. All individual values and subranges below 100 kg/m3 are included herein and disclosed herein; for example, the density may be from a lower limit of 30, 35, 40, 45, 50, 55, 60, 65, 70, 75, or 80, to an upper limit of 40, 45, 50, 55, 60, 65, 70, 75, 80, 85, 90, or 95.

Molded foam can be made according to embodiments of the invention by transferring the reactants to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, are optionally used. Molded foams may have densities below 100 $kg/m^3$. All individual values and sub ranges below 100 $kg/m^3$ are included herein and disclosed herein; for example, the density may be from a lower limit of 30, 35, 40, 45, 50, 55, 60, 65, 70, 75, or 80, to an upper limit of 40, 45, 50, 55, 60, 65, 70, 75, 80, 85, 90, or 95. In certain, embodiments the molded foams may have densities between 40 and 55 $kg/m^3$, or between 45 and 50 55 $kg/m^3$.

Embodiments encompass both cold-molding processes as well as hot-molded processes. However, surprisingly, it has been found improved skin formation is obtained when using the reaction system described herein. The skin may include a surface skin of about 12-25 μm as well as a subsurface layer of 150-250 μm thickness which has small cell sizes (50-150 μm). This makes the skin thicker and/or much stronger and resistant to de-moulding forces, resulting in eliminating de-moulding defects. Furthermore, the presence of these smaller very near subsurface cells gives a smoother surface which results in better haptic (or feeling) properties of the foam.

EXAMPLES

The following examples are provided to illustrate the embodiments of the invention, but are not intended to limit the scope thereof. All parts and percentages are by weight unless otherwise indicated.

The following materials are used:

| | |
|---|---|
| Polyol A | A 1,500 Equivalent Weight, glycerin initiated polyoxyethylene/polyoxypropylene polyether triol, containing about 70% polyoxyethylene and 30% polyoxypropylene by weight, with about 80% primary hydroxyls. |
| SPECFLEX* NC 632 | A polyoxyethylene capped polyoxypropylene polyol initiated with a blend of glycerol and sorbitol, having an average functionality around 4.7, and a polyoxyethylene cap percentage around 15.2%, with a final primary OH around 77% and an average molecular weight of 5100 and an OH number of 32.5 mg KOH/g, available from The Dow Chemical Company. |
| SPECFLEX* NC 700 | A grafted polyether polyol containing 40% copolymerized styrene and acrylonitrile (SAN) in a polyether having an OH number of 19-23 mg KOH/g. Available from The Dow Chemical Company. |
| VORANOL* 1447 | A glycerin initiated polyoxyethylene capped polyoxypropylene/polyoxyethylene triol having an average molecular weight of 4500, a polyoxyethylene percentage around 90%, a final primary OH around 80-90%, and OH number of 37 mg KOH/g, available from The Dow Chemical Company. |
| VORANOL* CP 1421 | An about 1,675 equivalent weight polyoxyethylene/polyoxypropylene capped polyoxypropylene polyol initiated with glycerol, having nominal functionality of 3, a polyoxyethylene percentage around 78%, a final primary OH around 55%, and a hydroxyl number of about 32 mg KOH/g. Available from The Dow Chemical Company. |

-continued

| | |
|---|---|
| VORANOL* CP 755 | A glycerine initiated polyoxypropylene triol with an average molecular weight of 700 and an OH number of 239 mg KOH/g, available from The Dow Chemical Company. |
| VORANOL* P 2000 | A glycol initiated polyoxypropylene diol with an average molecular weight of 2000 and an OH number of 53-58 mg KOH/g, available from The Dow Chemical Company. |
| DABCO 33 LV | A 33% solution of triethylenediamine in propylene glycol available from Air Products & Chemicals Inc. |
| NIAX A-1 | A 70% bis(2dimethyl aminoethyl)ether and 30% dipropylene glycol catalyst available from Momentive Performance Materials. |
| NIAX C-174 | An Amine blowing catalyst from Momentive Performance Materials Inc. |
| POLYCAT 15 | N,N-bis-(3-dimethylaminopropyl)-amine available from Air Products and Chemicals, Inc. |
| NIAX L 6633 | A silicone based surfactant available from Momentive Performance Materials. |
| OSI L6900 | A non-hydrolizable silicone copolymer surfactant, available from Momentive Performance Materials Inc. |
| TEGOSTAB 8715 LF2 | A silicone surfactant available from Evonik Industries. |
| ISONATE* 125 M | A 4,4'-methylene diphenyl diisocyanate (Pure MDI) based isocyanate available from The Dow Chemical Company. |
| ISONATE* OP 50 | A 50 percent 4,4'-methylene diphenyl isocyanate, 50 percent 2,4'-methylene diphenyl isocyanate mixture having a functionality of 2.0 and an equivalent weight of 125 g/equivalent available from The Dow Chemical Company |
| VORANATE* M 229 | A PMDI (polymeric MDI) available from The Dow Chemical Company. |

*ISONATE, SPECFLEX, VORANATE and VORANOL are trademarks of The Dow Chemical Company.

Isocyanate Component

An isocyanate component is prepared by first combining ISONATE 125 M (27.5 parts per weight), ISONATE OP 50 (36.2 parts per weight), and VORANATE M 229 (26.8 parts per weight) and mixing in a drum roller for the 30 minutes. Prepolymers are then formed by adding a polyol, VORANOL* CP 1421(9.5 parts per weight) under mixing. The reaction is completed by heating inside a reactor at 70° C. for 60 minutes.

Examples 1 and 2 and Comparative Examples A and B

Foams are prepared by combining the Isocyanate Component with a Polyol Component listed in Table 2. The polyurethane foams are made by a one-shot process using high pressure machines for the weighing and for the proper dispensing of the Isocyanate Component and the Polyol Component. The components are maintained at 25° C. and are transferred to a mix head (a FPL 14" mixing head) at 160 bar, and into a mold at 250 g/s. The foams are produced at an isocyanate index of 70. Aluminium molds and epoxy molds are used, which are heated by water recirculation set at a temperature of 35-50° C., and treated with solvent based release agent to allow the demolding. The demolding time is fixed at 4-5 minutes. The physical mechanical properties were tested according to test methods of Table 1:

TABLE 1

| | Test method |
|---|---|
| Density (kg/m$^3$) | ISO 845 |
| Compression set 50% (%) | ISO 1856-1 ASTM 3574 |
| Compression set 75% (%) | ISO 1856-1 ASTM 3574 |
| CLD zero resilience Hysteresis | ISO 3386-1 |
| CLD zero resilience (stress 40%) | ISO 3386-1 |
| Tg (° C.) | DMTA internal method |

TABLE 2

| | Example 1 | Example 2 | Comparative Example A | Comparative Example B |
|---|---|---|---|---|
| SPECFLEX NC 632 | | 17 | 17 | 17 |
| SPECFLEX NC 700 | 17 | | | |
| VORANOL CP 755 | 5 | 5 | 5 | 5 |
| VORANOL P 2000 | 14 | 14 | 14 | 14 |
| VORANOL 1447 | 59.30 | 59.30 | | |
| VORANOL CP 1421 | | | 60.15 | |
| POLYOL A | | | | 59.65 |
| Water | 3.35 | 3.35 | 3.1 | 3.1 |
| DABCO 33 LV | | | 0.2 | |
| NIAX A-1 | 0.10 | 0.10 | | 0.10 |
| POLYCAT 15 | 0.55 | 0.55 | 0.4 | 0.55 |
| NIAX C-174 | | | 0.1 | |
| TEGOSTAB 8715 LF2 | 0.50 | 0.50 | | 0.50 |
| OSI L6900 | | | | 0.10 |
| NIAX L 6633 | 0.2 | 0.2 | 0.05 | |
| Physical mechanical properties | | | | |
| Density (kg/m$^3$) | 44 | 46 | 44 | 44 |
| Compression set 50% (%) | 2.7 | 3.8 | 4.26 | 4.23 |
| Compression set 75% (%) | 3.4 | 6.41 | 5.85 | 6.8 |
| CLD zero resilience Hysteresis | 35.4 | 31.3 | 32.5 | 35.7 |
| CLD zero resilience (stress 40%) | 0.63 | 0.55 | 0.50 | 0.61 |
| Tg (° C.) | 6.7 | | 15.67 | 10.29 |

TABLE 2-continued

|  | Example 1 | Example 2 | Comparative Example A | Comparative Example B |
|---|---|---|---|---|
| Performance rating | | | | |
| Skin formation rating (measured on surface defects) | ++ | + | + | − |
| Sticky surface rating * | ++ | ++ | − | − |
| Processing rating | + | + | − | − |
| SEM Images Analysis | | | | |
| Skin thickness (μm) | 12-25[d] | | 12-25[c] | 12-25[a] |
| Subsurface cell size (mm) | 0.4-0.75 | | 0.75-1.2 | 0.75-1.2 |
| Bulk cell size (mm) | 0.6-1.2 | | 1.2-2.2 | 2.0-3.2[b] |

[a] Skin thickness is about the same as the cell wall thickness. Cells just under the surface are smaller than in the bulk but are in many cases flattened.
[b] A layer with about three cells in thickness just under the surface have a smaller cell size: 0.75-1.2 mm.
[c] Not really a surface because of a large number of openings. However, surface is again just the thickness of the cell walls. Smaller subsurface cells extend further below surface than with Comparative Example B.
[d] Ultimate surface is also only one cell wall thickness, but there is a thin subsurface layer (homogeneous skin, 150-250 μm thick) with small cell sizes (50-150 μm). This makes the "skin" thicker and/or much stronger and resistant to de-moulding forces. The presence of these smaller very near subsurface cells gives a smoother surface which play a role in the better feel of this foam. The samples have two very similar Tg as measured by DSC: first around −60° C. and the second one around −30° C.

SEM images of foam outer skin and core foam (1 cm under the skin) are illustrated in FIGS. 1 to 6. Differences between Example 1 and Comparative Examples A and B can be seen in the foam cell morphology as well as the skin surface morphology. The observed differences may explain some of the differences in the feel of the foam surfaces although the difference in haptics might also be dependent on the differences in the viscoelastic behavior.

Figure 3:
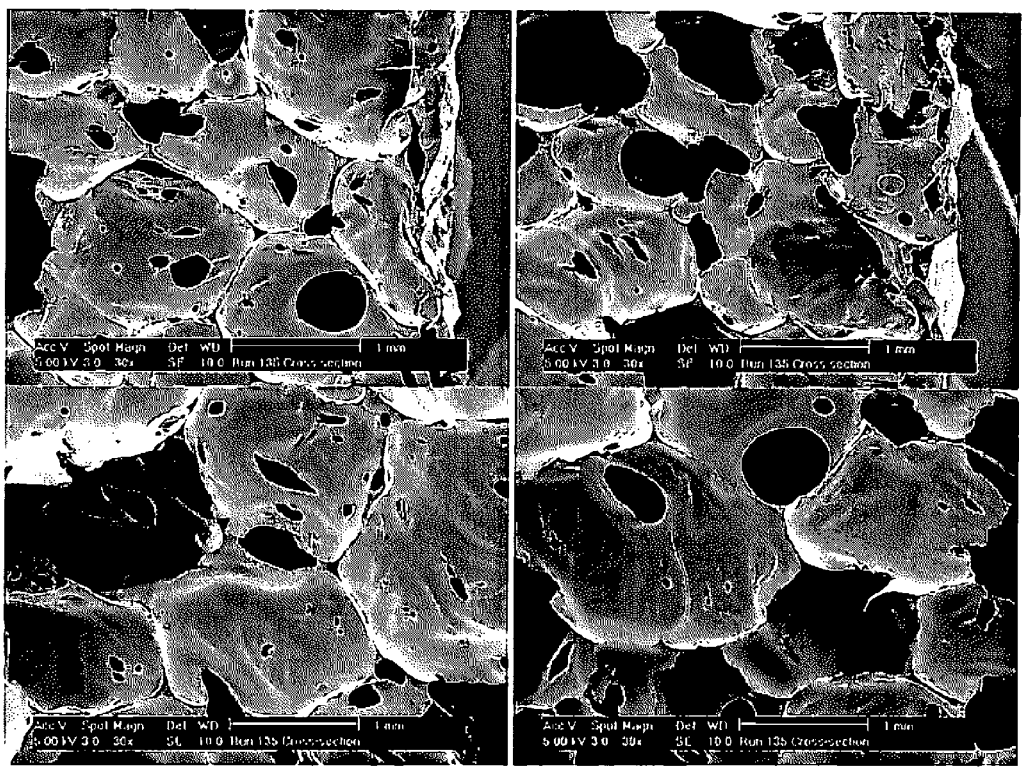
Figure 5:
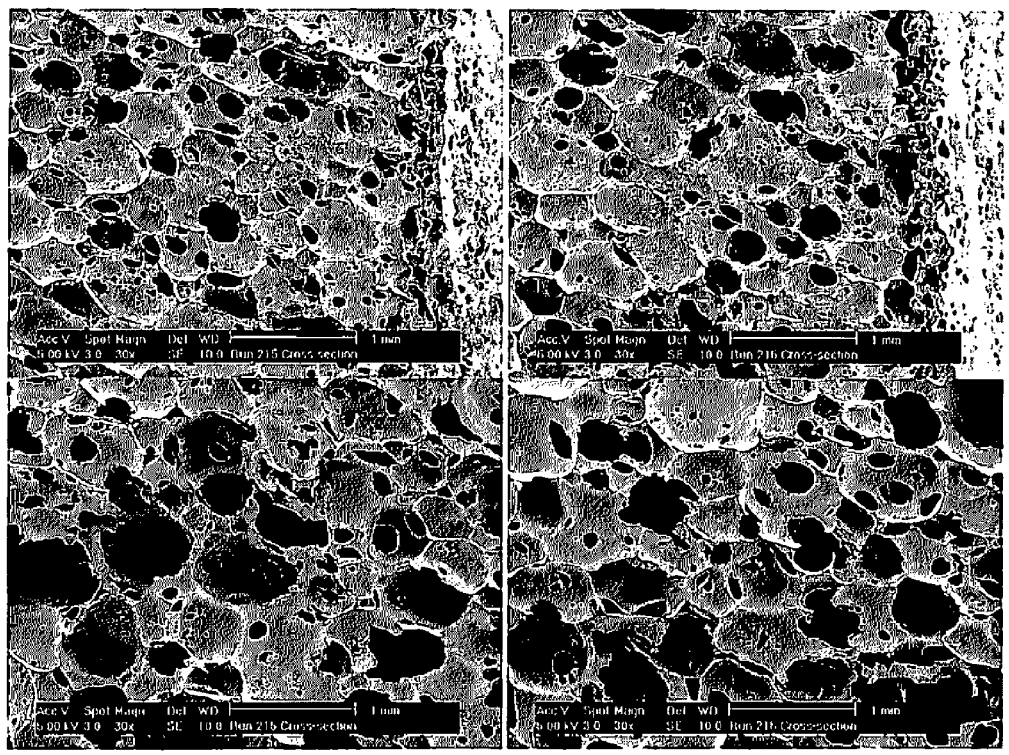

FIGS. 1, 3, and 5 show the differences in foam cross-sections of interface skin and core foam for Comparative Example A, Comparative Example B, and Example 1, respectively. It can be seen that the cell size just under the skin is larger for Foam Comparative Example A and Comparative Example B than for foam Example 1. As a result, the skin layer is much thinner for the two Comparative Examples resulting in a more fragile and more easily damaged skin during de-moulding. Even though the skin of Example 1 still has a foam-like structure, it has very small cell sizes and so has a significantly higher density than the underlying foam. The greater thickness and higher density of the skin in the foam should give better de-moulding properties as observed.

Figure 2:
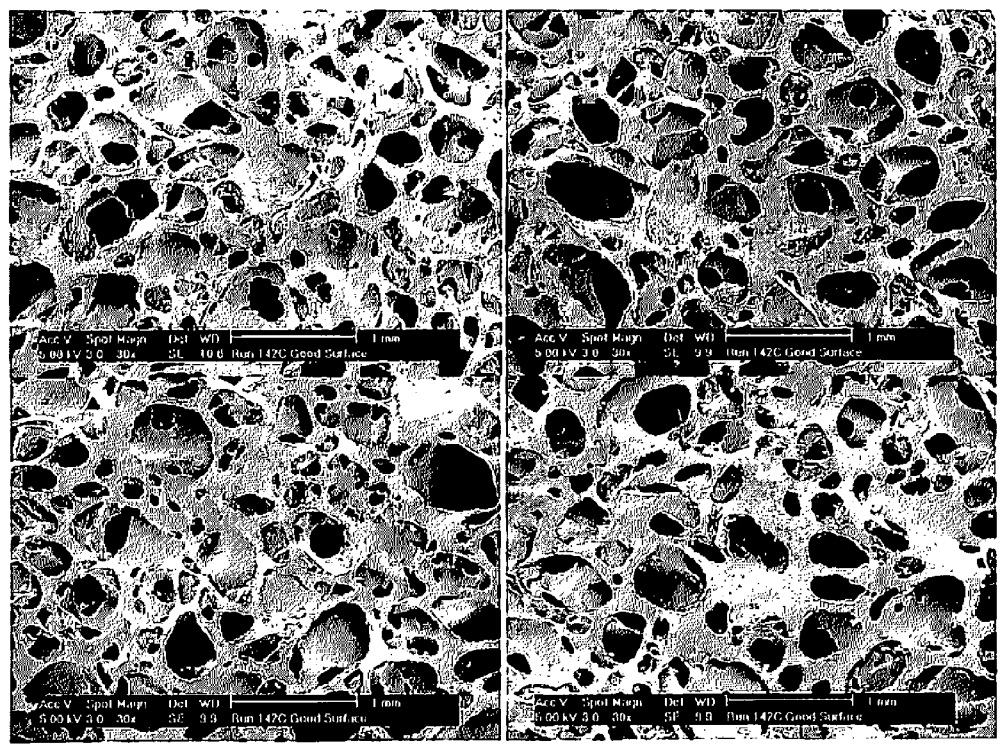
Figure 4:
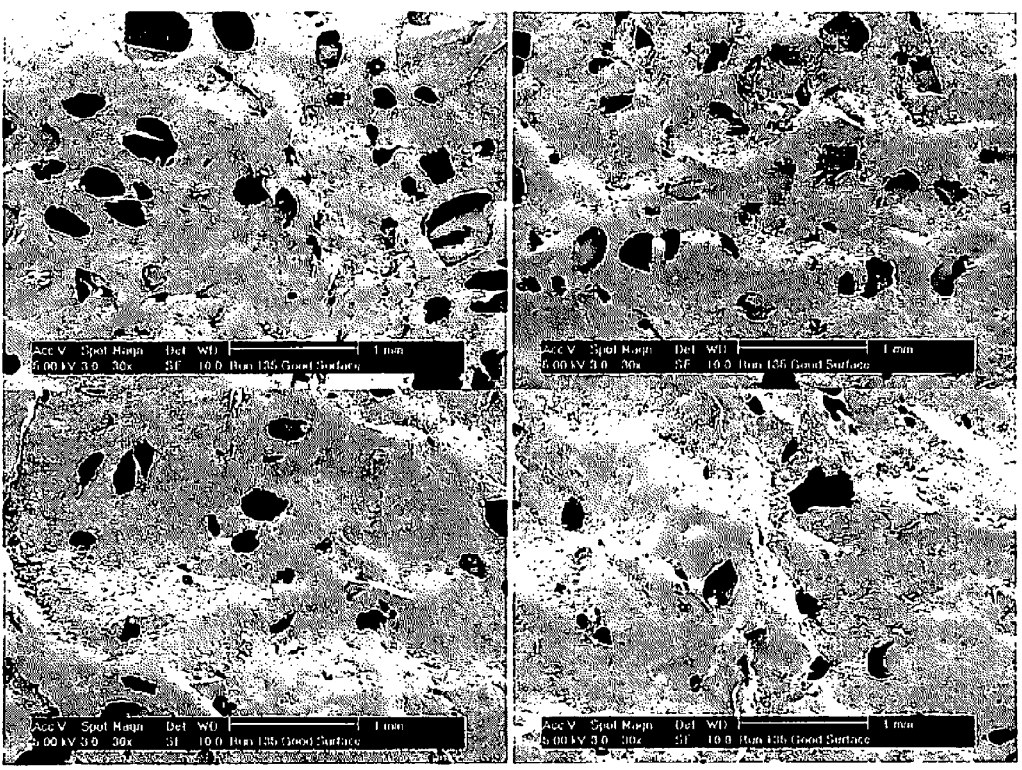
Figure 6:
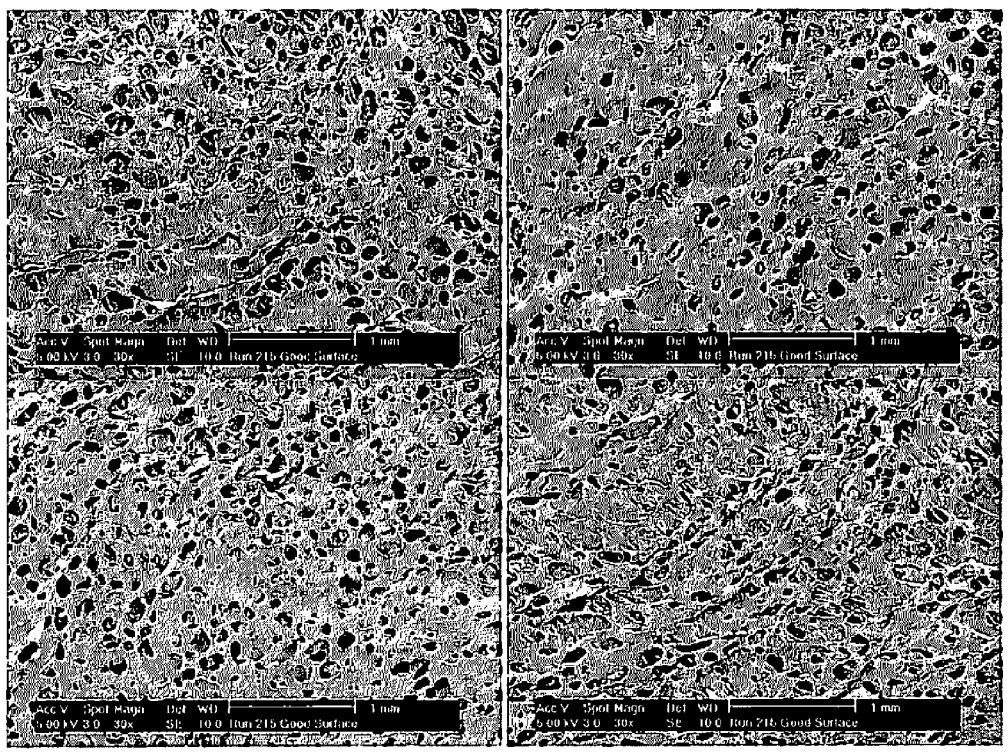

FIGS. 2, 4, and 6 show the top surface morphologies for Comparative Example A, Comparative Example B, and Example 1, respectively. All the foams have surfaces with some holes as a result of the underlying cell structure breaking through to the surface. This phenomenon is most prevalent for the Comparative Example A and is least prevalent for Comparative Example B. Because Example 1 has the thickest skin and the smallest near surface cell size, it has a less wavy surface with higher frequency. The result of this surface is that the human hand/finger experiences a smoother surface with a more velvety feel. The observed effect may be purely caused by the surface morphology although some influence of the material viscoelastic behavior may also be playing a role. Because the comparative foams have thin skin layers with larger near surface cell sizes, the skins have a larger wavy surface but with a lower frequency. However, higher roughness gives these two foams poorer haptics (or feeling) characteristics. Furthermore, these pads could not be used with a light fabric cover.

While the foregoing is directed to embodiments of the present invention, other and further embodiments of the invention may be devised without departing from the basic scope thereof, and the scope thereof is determined by the claims that follow.

The invention claimed is:

1. A reaction system for preparation of a viscoelastic polyurethane foam comprising:
    (a) an isocyanate reactive component comprising:
        (i) from 25 to 80% by weight of the isocyanate reactive component of at least one polyoxyethylene capped polyoxypropylene/polyoxyethylene polyol having a combined number average equivalent weight from 1300 to 1700, a polyoxyethylene percentage of between 75% and 95% by weight of the combined amounts of polyoxypropylene and polyoxyethylene, and a primary OH percentage of between 80 and 95% of the total number of OH groups of the polyoxyethylene capped polyoxypropylene/polyoxyethylene polyol;
        (ii) from 5 to 30% by weight of the isocyanate reactive component of at least one low functionality polyol having a functionality of between 1.5 and 2.5, a combined number average equivalent weight from 500 to 1500 and an OH number of 40 to 70; and
        (iii) from 5 to 30% by weight of the isocyanate reactive component of at least one polyoxyethylene capped polyoxypropylene polyol having an average functionality between 4 and 6, a combined number average molecular weight from 4000 to 6000, and an OH number of 25 to 45;
    (b) an isocyanate component;
    (c) one or more blowing agents;
    (d) a catalyst component; and
    (e) a silicone based surfactant.

2. The reaction system of claim 1, wherein the isocyanate reactive component further comprises:
    (iv) from 2 to 20% by weight of the isocyanate reactive component of at least one triol having a combined number average equivalent weight from 200 to 400 and an OH number of 175 to 275.

3. The reaction system of claim 1, wherein the one or more blowing agents comprises water.

4. The reaction system of claim 1, wherein the isocyanate component (b) comprises an isocyanate terminated prepolymer.

5. The reaction system of claim 4, wherein the isocyanate terminated prepolymer comprises the reaction product of a polyol and a mixture of 2,4'-methylene diphenyl diisocyanate, 4,4'-methylene diphenyl diisocyanate, and polymeric methylene diphenyl diisocyanate.

6. A polyurethane foam, comprising a reaction product of the reaction system of claim 1.

7. The polyurethane foam of claim 6, wherein the polyurethane foam is molded and comprises a skin having a thickness of 100-300 μm thick.

8. The polyurethane foam of claim 7, wherein the skin has a thickness of 150-250 μm.

9. The polyurethane foam of claim 8, wherein the skin comprises polyurethane cells having diameters of 50-150 μm.

* * * * *